United States Patent Office 2,742,054
Patented Apr. 17, 1956

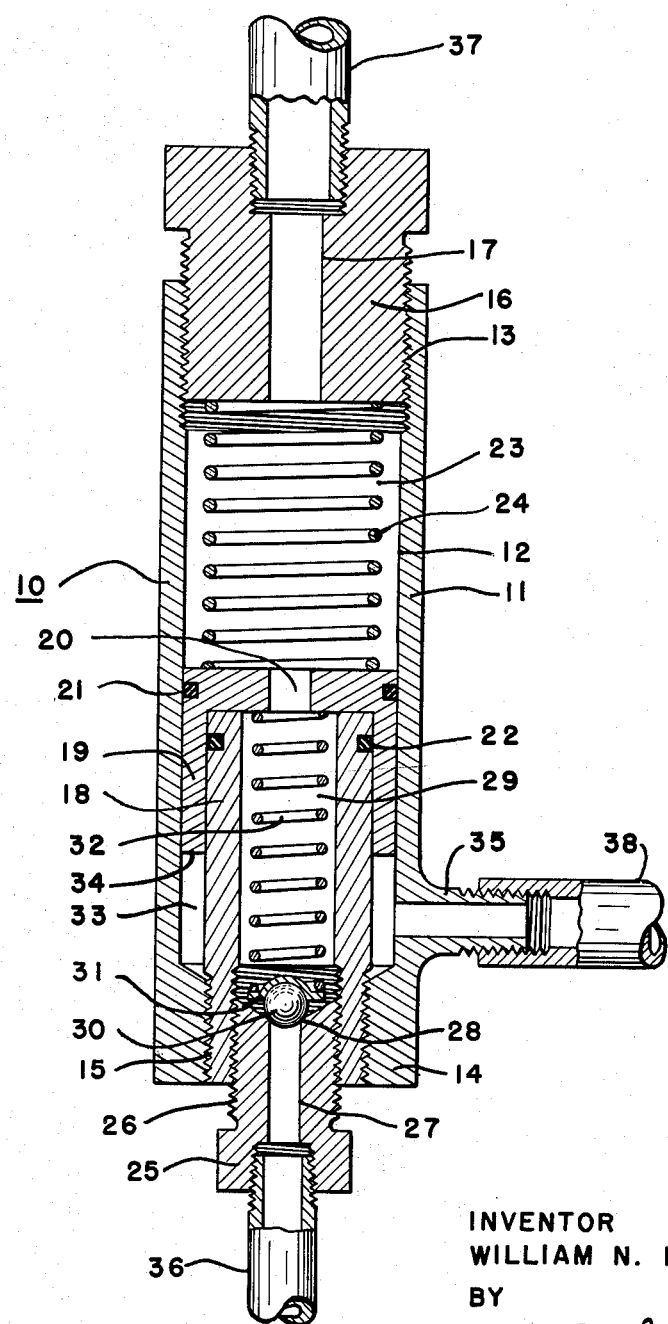

2,742,054

SPRING BIASED SAFETY VALVE WITH SPRING BIAS RELIEVING MEANS

William N. Poundstone, Morgantown, W. Va., assignor to Pittsburgh Consolidation Coal Company, Pittsburgh, Pa., a corporation of Pennsylvania Application February 5, 1954, Serial No. 408,374

2 Claims. (Cl. 137—522)

The present invention relates to a fluid pressure-relief valve having a relief pressure setting which is diminished in response to a fluid pressure exerted directly upon the valve from an outside source.

Frequently it is desirable to vent a flowing fluid through an alternate conduit in response to increased fluid pressures above a predetermined value. The present invention provides a pressure relief valve having a normal relief pressure setting and provisions for diminishing the relief pressure setting instantaneously in response to increased fluid pressures in a controlling hydraulic circuit. The valve is especially adapted for use in a by-pass conduit for venting a fluid flowing in one circuit when increased pressures develop in a fliud flowing in a different circuit.

In a copending application Serial Number 408,371 filed on even date herewith and entitled "Hydraulic Powered Mining Machines," I have provided a new system for automatically coordinating the operation of two hydraulic circuits which occur in ordinary mining machines, such as drilling machines and continuous miners, whereby the advancement of the working tool is carried out automatically at a rate corresponding inversely to the resistance encounted by the working tool. The valve of the present invention is described and not claimed in the aforementioned application.

The invention, its objects and advantages may be understood by reference to the drawing which is a side elevation view, partly in cross-section of my new valve.

In the drawing, the numeral 10 indicates generally the valve structure of the present invention. The valve comprises a hollow cylindrical casing 11 having an axial bore 12 with internal threading 13 at one end. The bore 12 extends through the casing to a collar 14 having internal threads 15 near the other end of the casing. An externally threaded nipple 16 having an axial bore 17 engages the casing threads 13 to seal the casing. A hollow sleeve 18 having internal and external threads at one end and having a smaller outer diameter than the bore 12 of the casing, engages the collar threads 15 of the casing. A cup-shaped piston 19 having a port 20 in its flat surface, has an annular thickness equal to the difference between the external sleeve radius and the casing bore radius. A groove 21 is provided in the outer surface of the piston 19 for receiving a sealing ring to effect a tight fit between the piston and the casing bore 12. A similar groove 22 is provided in the outer wall of the sleeve 18 for receiving a sealing ring to effect a tight seal between the sleeve and the inner surface of the piston 19.

In the chamber 23 between the piston 19 and the nipple 16, a spring 24 is seated against the nipple 16 and the flat surface of the piston 19 under compression which can be adjusted by threading the nipple 16. The spring 24 resists movement of the slidable piston 19 away from the sleeve 18.

A valve seat insert 25 having external threads 26 and an axial bore 27 is provided with a valve seat 28 which is an orifice leading into the chamber 29 formed within the sleeve 18. The valve seat insert 25 is threaded into the inner threads of the sleeve 18. A sphere 30 having a diameter exceeding the axial bore 27 is provided for sealing the valve seat 28 to obstruct the axial bore 27. Any bore obstruction might be substituted for the sphere 30, for example, a conical valve head conforming to the valve seat 28. A hemispherical cap 31, conforming generally to the sphere 30, provides a flat upper surface for seating one end of a spring 32 in the chamber 29. The other end of the spring 32 is seated against the inner flat surface of the cup piston 19.

An annular chamber 33 is formed by the sleeve 18, the casing bore 12, the collar 14 and the bottom fluid piston surface 34 of the piston 19. A lateral radial port 35 is provided through the casing 12 to communicate with the annular chamber 33.

In operation, the valve is connected to a conduit 36 associated with a pressurized fluid source. Normally the sphere 31 obstructs the bore 27. So long as the cup piston 19 remains in the position indicated in the drawing, the compressive force of the spring 32 is sufficient to resist any fluid pressures up to the predetermined normal relief pressure exerted against the sphere through the bore 27. The fluid which passes the sphere 30 flows into chamber 29, through the port 20 into the chamber 23, through the bore 17 and out from the valve through a conduit 37.

Normally the piston will be maintained in the position indicated in the drawing by the compressive force of the spring 24. However, when the controlling fluid pressure transmitted to the annular piston working chamber 33 through the port 35 exceeds a predetermined value, the fluid pressure in the chamber 33 moves the piston to compress the spring 24. With the piston 19 moved away from the sleeve 18, the spring 32 elongates and reduces the compression force against the cap 31. Thereby the relief pressure of the valve is diminished from it normal value. So long as the pressure on the conduit 38 continues to exceed the predetermined value required to overcome the compressive force in the spring 24, the relief pressure setting of the valve remains below normal. When the pressure of the fluid in the conduit 38 diminishes once more, the spring 24 restores the cup piston 19 to the position indicated in the drawing and the normal pressure relief setting is restored in the valve 10.

The action of the valve is automatic and instantaneous. When the pressure in the conduit 38 exceeds a predetermined value, the relief setting of the valve is reduced instantly so that the pressure in the conduit 36 is lowered.

The response of the valve described herein is instantaneous and, under some circumstances may be so rapid that a dampening device is required in the conduit 38 carrying the controlling liquid to avoid chattering of the hydraulic system. Such dampening device should permit the fluid in the conduit 38 to flow unrestricted into the chamber 33, but should provide a restricted flow of fluid from the chamber 33 back through the conduit 38. Thus the pressure in the conduit 36 will diminish instantaneously when the pressure in the conduit 38 increases; however the restoration of normal pressures in the conduit 36 will lag behind the diminishing pressures in the control conduit 38.

Compression forces in the spring 24 can be selected by a proper threading adjustment of the nipple 16 to control the response pressure of the valve. Similarly, the compression force of the spring 32 can be selected by a proper threading adjustment of the valve seat insert 25 to control the normal relief pressure setting.

Fluid systems having widely different pressures may be coordinated by using the present invention. Since the fluid circuit indicated at the conduit 38 does not communicate with the fluid circuit indicated at the conduit 36, both circuits may contain fluids having pressures of the same order, or the two circuits may contain fluids having widely differing pressures. The valve will operate instantaneously and automatically to control the pressure of the fluid through the conduit 36 in either instance.

And now, according to the provisions of the Patent Statutes, I have explained the principle, preferred construction, and mode of operation of my invention and have illustrated and described what I now consider to represent its best embodiment. However, I desire to have it understood that, within the scope of the appended claims, the invention may be practiced otherwise than as specifically illustrated and described.

I claim:

1. A valve comprising a casing having an axial cylindrical bore closed at one end by an axially bored nipple and closed at the other end by a hollow cylindrical sleeve extending into said casing bore in spaced relation with the wall of said bore and having its external end closed by an axially bored, externally threaded valve seat insert, a valve seat axially positioned on said valve seat insert within said sleeve, a ball for engaging said valve seat to obstruct the bore of said valve seat insert, a cup-shaped piston reciprocably mounted on said sleeve and having an external diameter conformable with said casing bore and an internal diameter conformable with the external diameter of said sleeve, providing two axial chambers and one annular chamber within said casing bore, an aperture in said cup-piston to effect communication between the two axial chambers, resilient means abutting the nipple at one end and the piston at the other end for resisting movement of said cup piston toward said nipple, resilient means abutting said ball at one end and said piston at the other end for resisting movement of said ball out of engagement with said valve seat, and a lateral port in said casing communicating with said annular chamber for admitting piston operating fluid into said annular chamber for moving said piston toward said nipple.

2. A valve comprising a hollow, cylindrical casing having centrally ported end sections and having an axial bore, a sleeve axially positioned within said casing in spaced relation with the wall of said bore and extending from one end section to the central portion of said casing, a slidable, cup-shaped piston reciprocably mounted on said sleeve and having an outer surface conforming to the bore of said casing and an inner surface conforming to the outer surface of said sleeve, whereby the casing bore is divided into a valve chamber within the sleeve and the piston, an annular chamber between the sleeve and the casing bore, and a piston chamber, an aperture in said piston to provide open communication between said piston chamber and said valve chamber, resilient means in said piston chamber abutting the other end section at one end and the piston at the other end to resist movement of said piston out of full engagement with said sleeve, a valve head within said sleeve for engaging and obstructing one end section port, resilient means abutting said valve head at one end and said piston at the other end within said sleeve to resist movement of said valve head out of engagement with said port, and a lateral port in said casing communicating with said annular chamber for admitting piston operating fluid into said annular chamber for moving said piston out of full engagement with said sleeve.

References Cited in the file of this patent

UNITED STATES PATENTS 2,138,969     Hobbs  ---------------- Dec. 6, 1938